Patented Aug. 28, 1928.

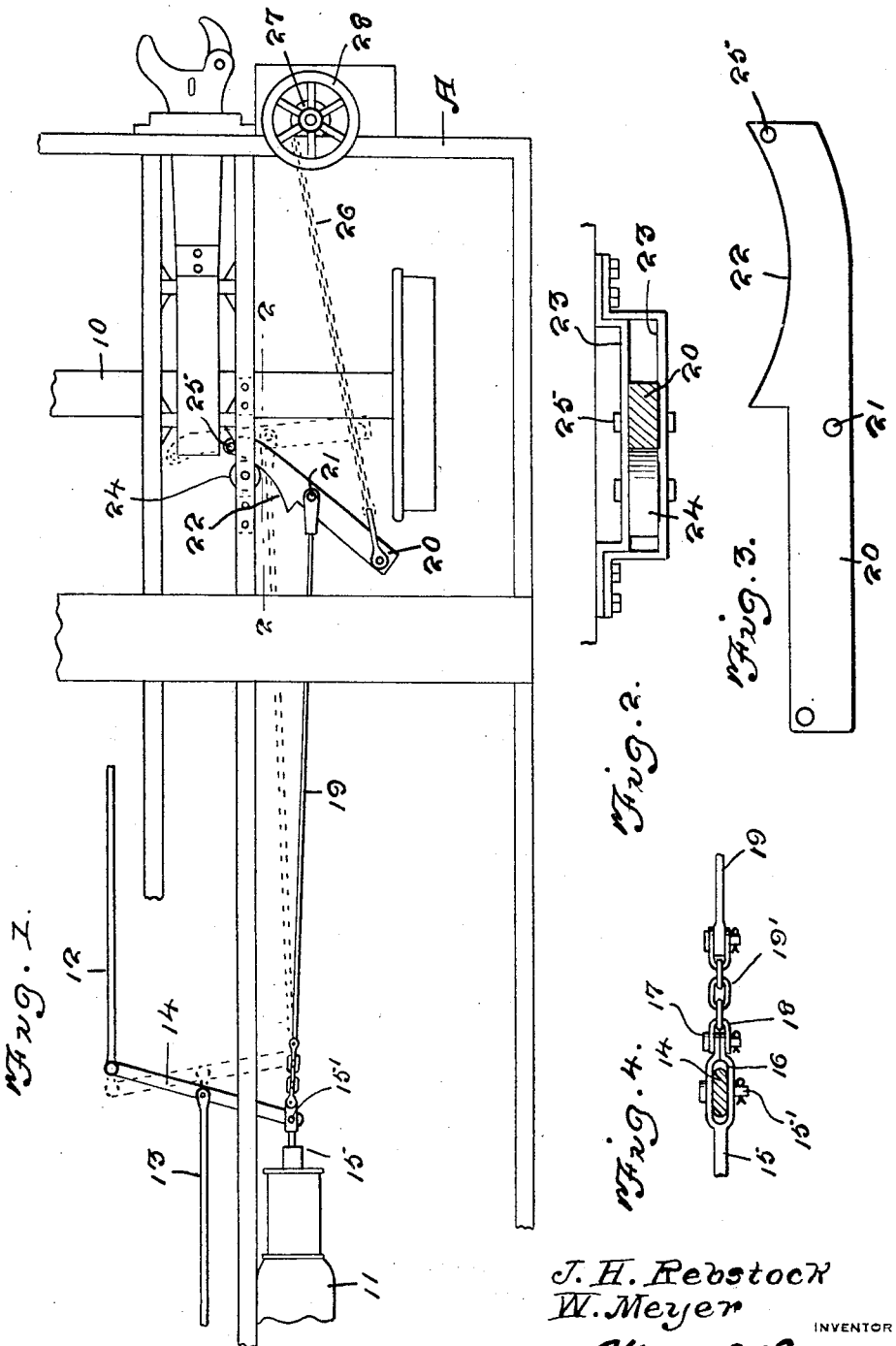

1,682,092

UNITED STATES PATENT OFFICE.

JULIUS H. REBSTOCK AND WALTER MEYER, OF CENTRALIA, ILLINOIS.

CAR BRAKE.

Application filed October 9, 1926. Serial No. 140,498.

This invention relates to car brakes, and contemplates the provision of a hand actuated mechanism for applying the brakes independently of the air controlled means, and requiring but a minimum of effort to apply the brakes effectively and in quick order.

The nature and advantages of the invention will be better understood when the following detail description is read in connection with the accompanying drawing, the invention residing in the construction, combination and arrangement of parts as claimed.

In the drawing forming part of this application like numerals of reference indicate similar parts in the several views and wherein:

Figure 1 is a fragmentary plan view of a car showing the application of the invention.

Figure 2 is a sectional view on line 2—2 of Figure 1.

Figure 3 is a plan view of the brake controlled lever.

Figure 4 is a fragmentary sectional view showing the connection between the lever and air brake cylinder.

Referring to the drawing in detail A indicates generally a car frame in which is journaled the axle 10. The usual air brake cylinder indicated at 11 is mounted upon the frame A, while the brake rods leading to the brakes are indicated at 12 and 13 respectively. These brake rods are pivotally connected with an arm 14 which is adapted to be operated by the air brake mechanism of the car, or the hand operated means as the occasion may require, and for which purpose the piston rod 15 of the air brake cylinder is longitudinally slotted at one end as at 16 to receive the arm 14 as clearly illustrated in Figure 4. The free ends of the slotted portion are brought in face to face contact and connected together by a pin 17 which is also utilized to associate the yoke 18 with this end of the piston rod 15. The arm 14 is pivoted on the piston rod 15 as indicated at 15'. The element 19 connects the control lever 20 for the brakes with the yoke 18, and the connection includes a plurality of links 19' as clearly shown in Figure 4, and by reason of which arrangement it is manifest that the lever 20 may be actuated by the air brake system, independently of the hand actuated means to be hereinafter described. Furthermore by reason of this particular arrangement use may be made of the old style piston rod now in use thereby reducing the cost of applying brakes to cars now so equipped. The lever 20 is pivoted at a point between its ends with the element 19, this point of connection being indicated at 21. It will be noted that one end of the lever is provided with a curved surface or edge 22 at one end thereof, and this end of the lever is adapted to slide between spaced brackets 23 which are secured in any suitable manner to the adjacent sill of the car frame. The curved end of the lever is arranged in juxtaposition to a wheel 24 journaled between the brackets 23 and utilized as a fulcrum for the lever 20. Carried by this end of the lever is a cross pin 25 which cooperates with the brackets 23 to limit the movement of the lever 20 in one direction, as it assumes the position illustrated by full lines in Figure 1. The other end of the lever 20 is connected with a chain 26 which is adapted to be wound about or unwound from a shaft 27 actuated by a hand wheel 28. By reason of the construction shown and described, it is manifest that the lever 20 can be actuated from the hand wheel 28 independently of the air brake cylinder 11 to apply the brakes when desired. When use is made of the wheel 28, the lever 20 is initially moved with very little effort on the part of the brakeman, during which time the lever 20 fulcrums about the wheel 24, and as the brakes start to take hold, they can be further effectively applied in quick order, and with a minimum of effort, by reason of the leverage obtained by the construction and arrangement of parts disclosed. It is of course understood that the piston rod is not directly connected to the cylinder piston, but is merely inserted into the latter, permitting the hand brake to be operated independently of the power brake as desired.

While it is believed that from the foregoing description, the nature and advantages of the invention will be readily apparent, we desire to have it understood, that we do not limit ourselves to what is herein shown and described and that such changes may be resorted to when desired as fall within the scope of what is claimed.

What is claimed is:

1. In a car brake mechanism, an arm connected with the brake rods, means for operating said arm including a rotatable shaft, a lever mounted on the frame of the car for both pivotal and sliding movement, a connection between the lever and said arm, a flexible element connected with one end of the lever and adapted to be wound about and unwound from said shaft, and means for rotating said shaft.

2. In a car brake mechanism, an arm connected with the brake rods, spaced brackets supported on the frame of the car, a lever having a curved end portion operating between said brackets and mounted for both sliding and pivotal movements, a connection between the lever and said arm, a wheel journaled between said brackets and constituting a fulcrum for the curved portion of said lever, means for operating said lever, and means to limit the movement of the lever in one direction.

3. In a car brake mechanism, an arm connected with the brake rods, spaced brackets supported on the frame of the car, a lever having a curved end portion operating between said brackets and mounted for both sliding and pivotal movements, a connection between the lever and said arm, a wheel journaled between said brackets and constituting a fulcrum for the curved portion of the lever, a rotatable shaft, a flexible element connected with one end of the lever and adapted to be wound about and unwound from said shaft, and means carried by said lever and cooperating with said brackets to limit the movement of said lever in one direction.

In testimony whereof we affix our signatures.

JULIUS H. REBSTOCK.
WALTER MEYER.